April 18, 1961 R. H. MASON ET AL 2,980,898

FAULT LOCATION SYSTEM

Filed Sept. 20, 1957 6 Sheets-Sheet 1

INVENTORS
ROGER H. MASON
EDWARD J. RAITS
BY Moody and Goldman
ATTORNEYS

April 18, 1961 R. H. MASON ET AL 2,980,898

FAULT LOCATION SYSTEM

Filed Sept. 20, 1957 6 Sheets-Sheet 2

INVENTORS
ROGER H. MASON
EDWARD J. RAITS
BY Moody and Goldman
ATTORNEYS

April 18, 1961 R. H. MASON ET AL 2,980,898

FAULT LOCATION SYSTEM

Filed Sept. 20, 1957 6 Sheets-Sheet 3

INVENTORS
ROGER H. MASON
EDWARD J. RAITS
BY Moody and Goldman
ATTORNEYS

April 18, 1961 R. H. MASON ET AL 2,980,898

FAULT LOCATION SYSTEM

Filed Sept. 20, 1957

6 Sheets-Sheet 4

INVENTORS
ROGER H. MASON
EDWARD J. RAITS
BY
Moody and Goldman
ATTORNEYS

April 18, 1961 R. H. MASON ET AL 2,980,898

FAULT LOCATION SYSTEM

Filed Sept. 20, 1957 6 Sheets-Sheet 5

INVENTORS
ROGER H. MASON
EDWARD J. RAITS
BY Moody and Goldman
ATTORNEYS

INVENTORS
ROGER H. MASON
EDWARD J. RAITS
BY Moody and Goldman
ATTORNEYS 2,980,898

FAULT LOCATION SYSTEM

Roger H. Mason, Dallas, and Edward J. Raits, Irving, Tex., assignors to Collins Radio Company, Cedar Rapids, Iowa, a corporation of Iowa Filed Sept. 20, 1957, Ser. No. 685,256

3 Claims. (Cl. 340—253)

This invention relates to fault location means for unattended stations which are connected to a control station by either radio or wire carried waves.

The fault location system of this invention is particularly adaptable to a series of unattended microwave relay stations. Such relay stations link terminal stations which are generally attended. There may be a large number of such relay stations between the terminals, although ten is chosen for the description in this specification.

The invention accomplishes its fault location by indicating at the control station which of the unattended stations contains the fault or faults and what they are. Hence, a single maintenance team located at the attended station can service the entire chain of stations with a minimum loss of time, since the maintenance man knows exactly which station he must repair and which tools and parts he must bring with him to repair the particular existing faults. Accordingly, the number of maintenance personnel required for a chain of relay stations is greatly reduced.

The entire fault signaling is accomplished by plural audio tones modulated upon the microwave carrier frequency.

The invention permits the use of a single control panel of relatively simple design to be used to pinpoint faults within the entire chain of relay stations. Whenever a fault occurs at any unattended station, a visual and audio indication is given at the control panel. By operating only a pair of switches at the control panel, an operator can interrogate each unattended station. The particular station and its particular fault are then indicated at the control panel. Furthermore, the fault indicating and determining elements at each station are also automatically checked during interrogation processes.

Whenever a fault is received, the invention enables the transmission of that particular fault to be automatically locked out at its station, so that further interrogation of the same station can be made to determine if other faults exist there. Whenever a fault is removed, its lock-out is automatically removed so that a new interrogation can be made without difficulty.

The individual unattended stations are selectively interrogated by having an assigned pulse code for each unattended station. A panel switch releases the code at the transmitter and the interrogated unattended station recognizes its code and solely communicates with the control station for an interrogation of faults.

The fault alarm system of the invention is self-checking, wherein its tone generators, tone demodulators, and all relays required in the interrogation process must be properly operating or an indication is given at the control station of such failure.

Further objects, features and advantages of this invention will become apparent to a person skilled in the art upon further study of the specification and the accompanying drawings in which.

Figure 5:
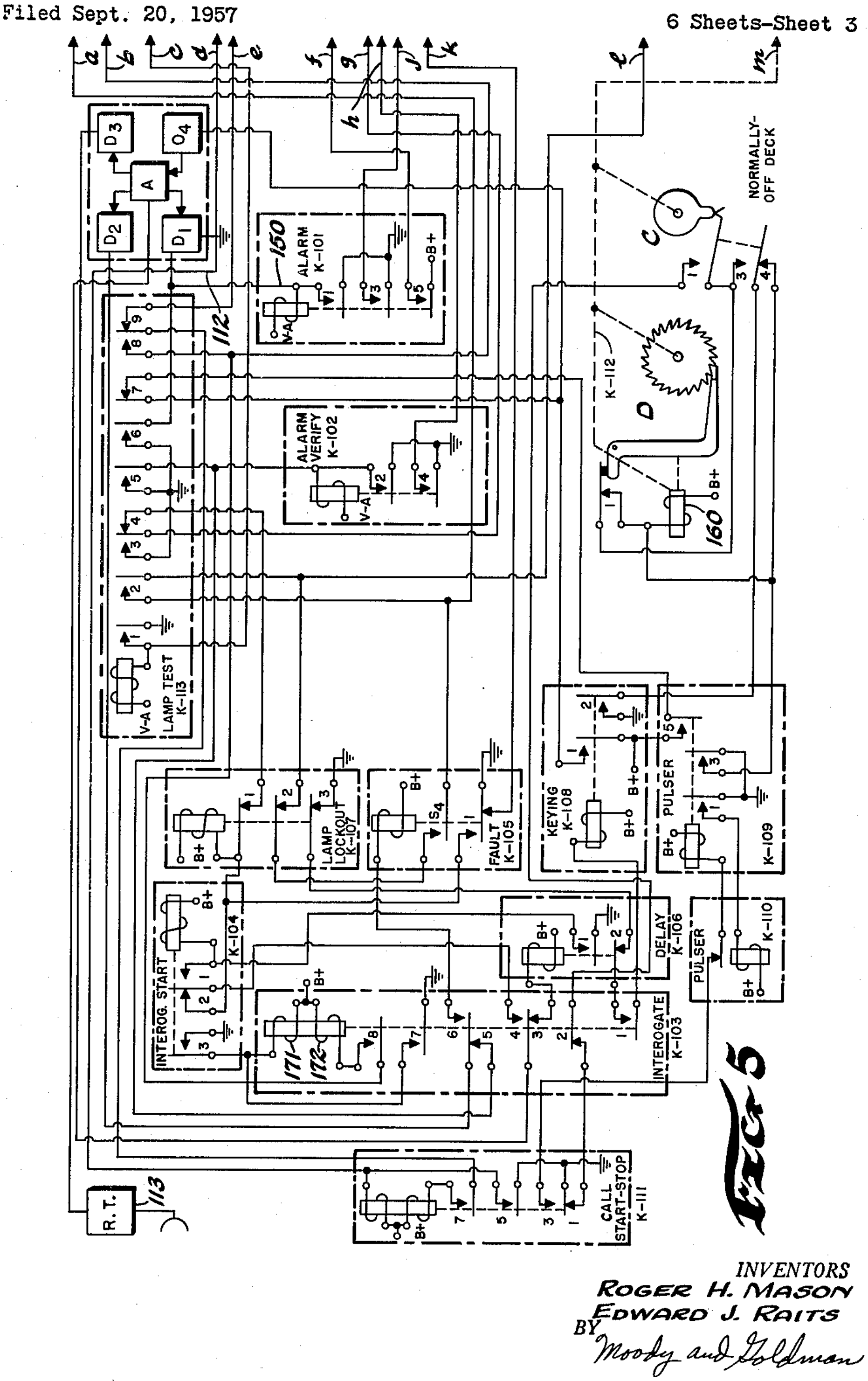
Figure 6:
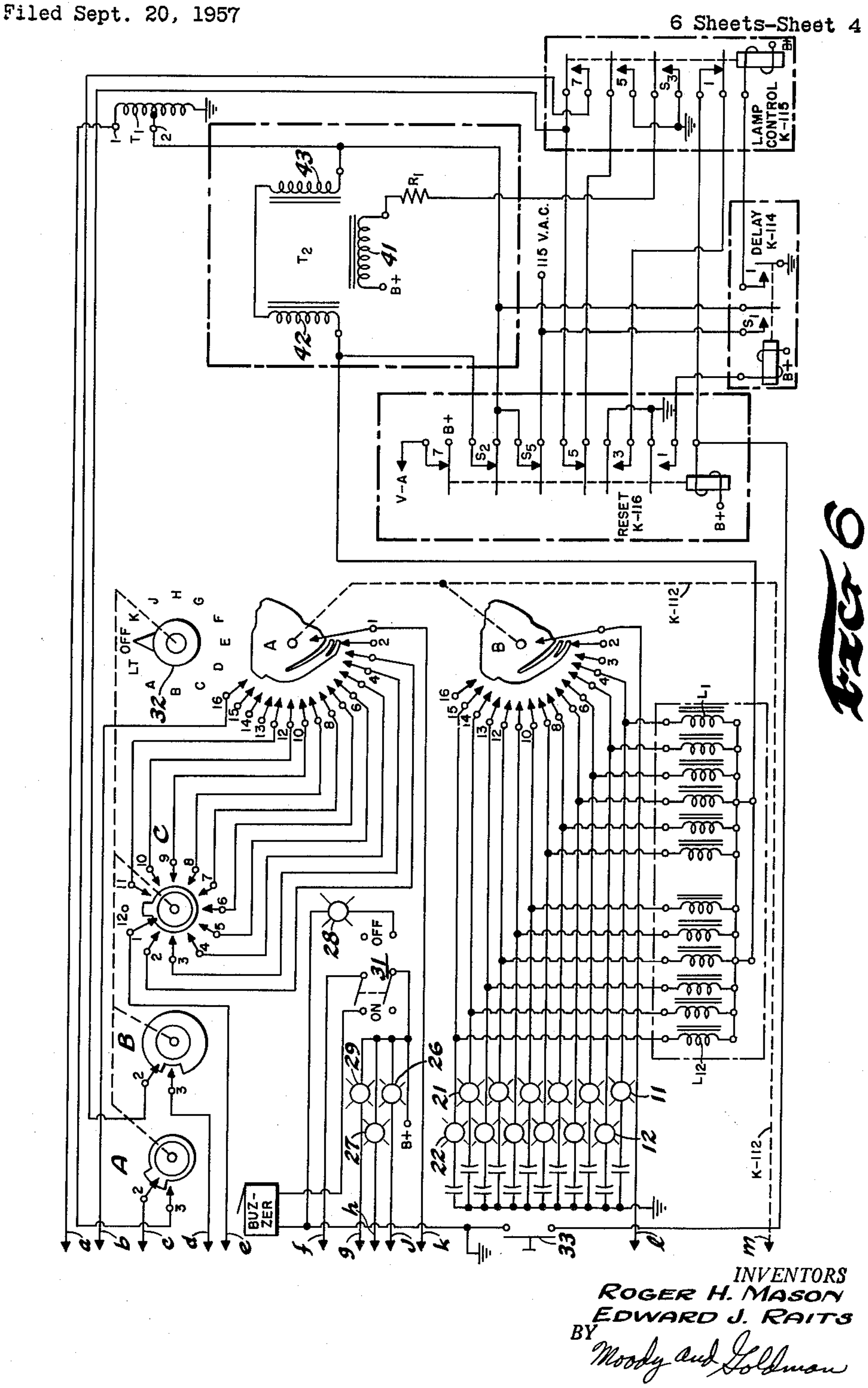
Figure 7:
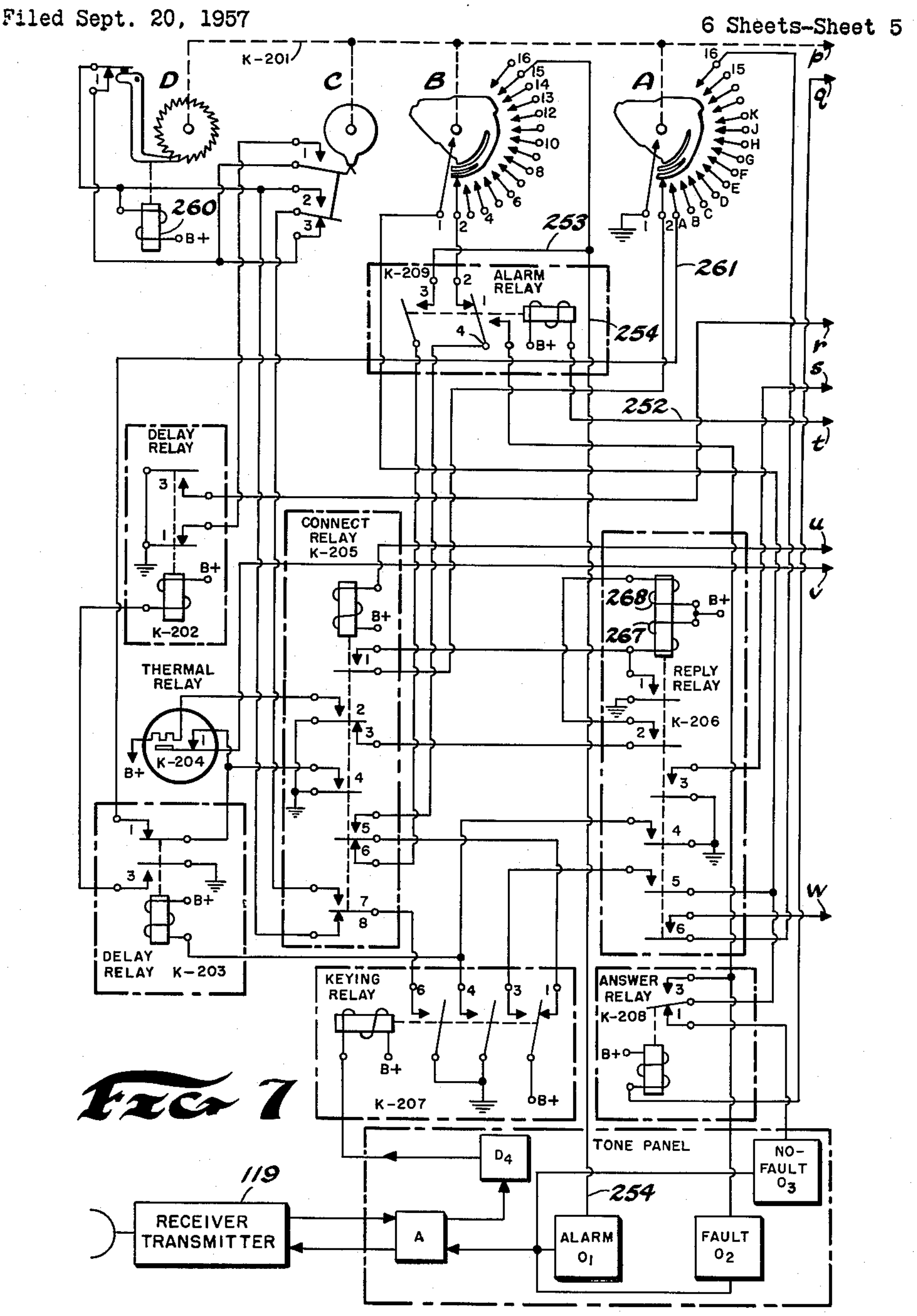
Figure 8:
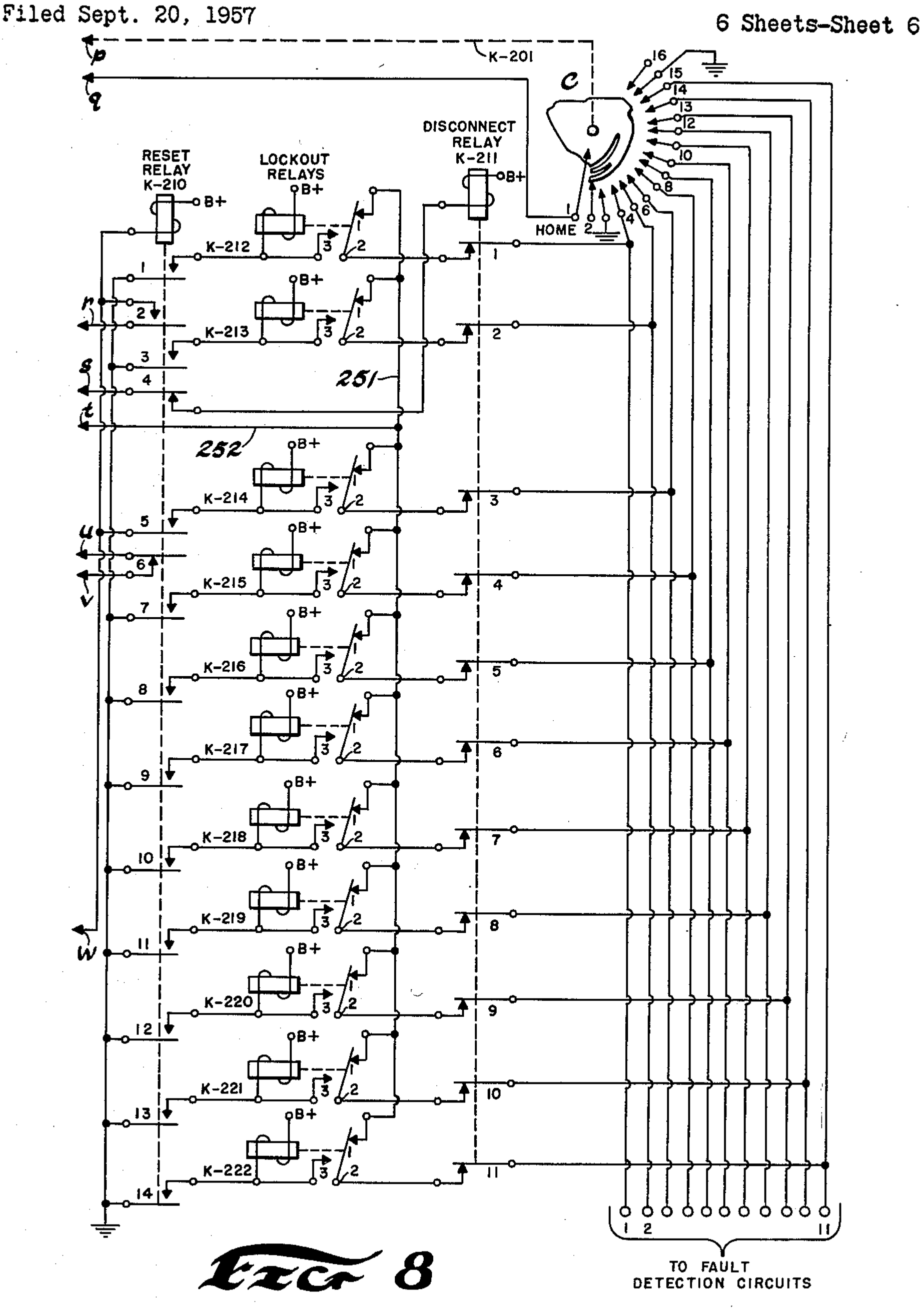

Figures 5 and 6 combine to provide a schematic diagram of a form of the fault circuitry at a control station; and Figures 7 and 8 combine to provide a schematic diagram of a form of fault circuitry at an unattended station.

Figure 3:
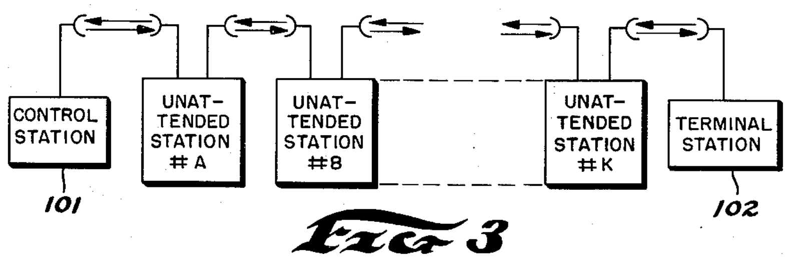
Figure 3 represents a microwave relay network in which the invention can be utilized.

Now referring to the drawings, Figure 3 illustrates a microwave relay network which can use the invention. It includes terminal stations 101 and 102 and ten unattended relay stations A, B, C, D, E, F, G, H, J, and K.

Figures 1, 2:
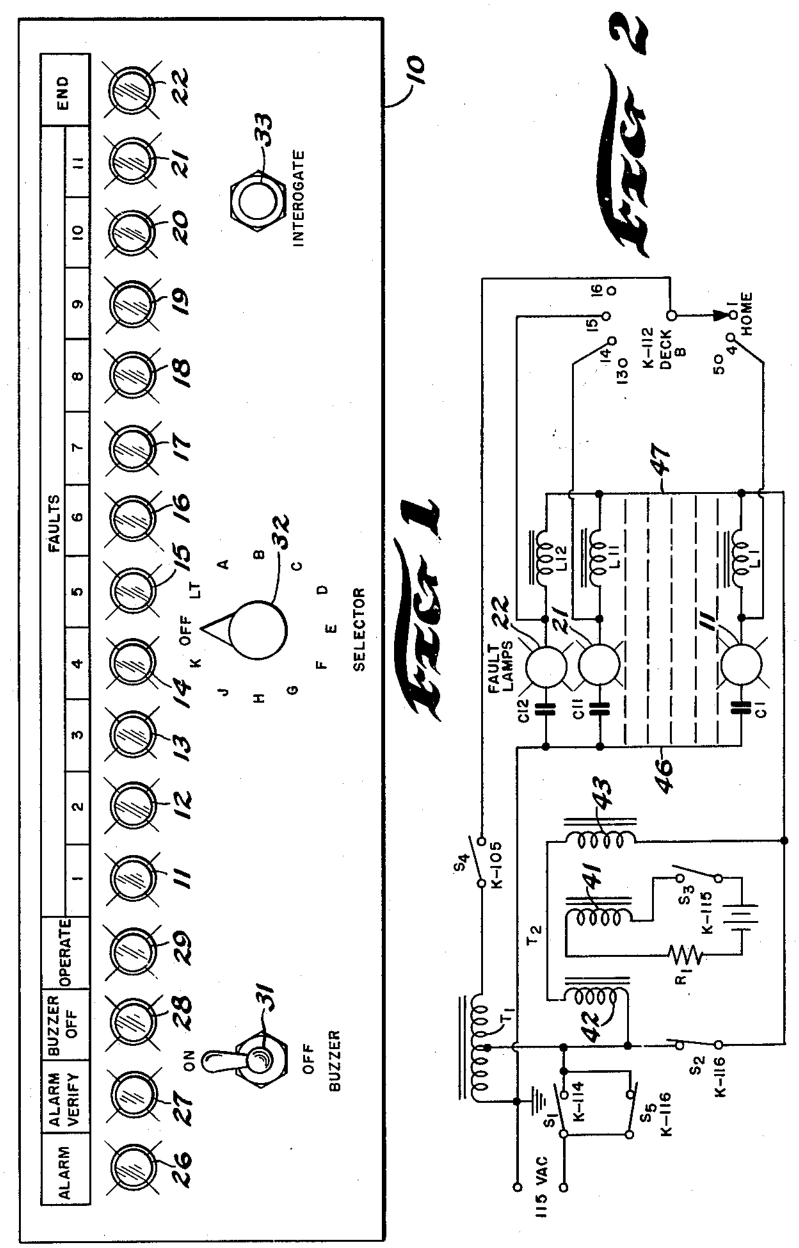
Figure 1 illustrates a control panel which can be used with the invention.
Figure 2 shows a simplified schematic arrangement of the control panel indicating lamp circuits used in the invention.

Figure 1 illustrates a control panel 10 which may be located at control terminal station 101 and which can accommodate the ten unattended microwave stations A through K. The control panel is also capable of indicating any of eleven specific faults that may occur at any of these unattended stations by means of lamps 11 through 21. Furthermore, the end lamp 22 indicates whether a fault exists in the fault signaling equipment at any station. Furthermore, four additional lamps 26, 27, 28 and 29 provide general information regarding faults in the system.

The control panel is operated as follows: When a fault occurs anywhere in the system, aural and visual signals are provided by a buzzer located behind the control panel and by lamp 26 being illuminated. The operator may then throw a buzzer on-off switch 31 to the off position to disconnect the buzzer since its further operation is not needed to specifically determine the fault. Lamp 28 ignites to indicate that the buzzer has been turned off.

A rotary selector switch 32 is used to contact the unattended stations individually. However, selector switch 32 is first turned to the "LT" (lamp test) position in order to test the control station circuitry and the panel lamps. As soon as an interrogate switch button 33 is pushed, the local checking process is begun, and very shortly all the lamps should be on. This preliminary step assures the operator that all panel lamps and their circuits are in working order.

The next step is to specifically locate the fault. Alarm lamp 26 merely shows that there is a fault in the system; no information has been obtained concerning the nature and location of the fault. To get this information, the operator turns selector switch 32 to position A and pushes interrogate button 33. The control station then automatically calls unattended station A by a process similar to dialing. Station A then transmits back to the control station a fault or no-fault answer for each of the eleven fault positions. If a fault exists, its respective lamp of 11 through 21 lights on the control panel. If no fault exists only "operate" lamp 29 flashes. When the test cycle at station A is completed, end lamp 22 lights.

If no fault is found at unattended station A, the operator turns selector switch 32 to the position B and pushes interrogate button 33. Lamp 22 is then de-energized. This calls the fault checking circuitry at unattended station B, and the cycle repeats as before. The operator continues this process, checking one unattended station at a time, until the fault is found.

Assume that the fault exists at station B. When station B replies, alarm verify lamp 27 ignites to indicate that this station is sending the alarm tone. The interrogation cycle then causes the appropriate lamp of 11–21 to be lit indicating the nature of the fault. The operator then rotates selector switch 32 to the off position and pushes button 33. All lamps then go out except the buzzer-off lamp 28, which goes out when buzzer on-off switch 31 is restored to on position.

The fault that has been located at station B has also been "locked-out" by the interrogation process. This lock-out prevents a found fault from continuing to send the alarm tone. Thus, if any new faults develop in the system, alarm lamp 26 is again illuminated, and the buzzer again sounds. Should station B again be interrogated after the fault has been found, the fault will register on the lamps as before except alarm verify lamp 27 would not light because no alarm is then being sent by station B. When the fault has been cleared, the lock-out is automatically reset as though the fault had never existed.

The fault alarm system is self-checking. Should the operator desire to know if any or all fault circuitry in the system is operating properly and therefore capable of sensing faults, he merely selects the station in question with selector switch 32 and pushes interrogate button 33 in sequence. In the normal case, there would be no alarm in the system and no fault at any station.

However, the invention provides that all tone generators, tone demodulators, and relays must be operating if the interrogation process is to be completed and end lamp 22 lighted.

End lamp 22 actually checks a twelfth fault at any station by checking the operation of its tone generators, relays and demodulators at the station even though no fault exists.

Once a particular unattended station has been called, the fault information is obtained by a process sometimes described as revertive pulsing. This requires that the control station send a call-out tone to the called unattended station for each fault position, and that a reply, fault or no-fault, must be given before the next call-out tone can be initiated. Thus, should any part of the system fail to function properly, the operation would stop and end lamp 22 would not light.

It is obvious from the previous discussion that the simple process of interrogating an unattended station checks the complete operation of the fault location system of that station and the control panel.

As explained previously, during the interrogation process the appropriate panel lamps are lit and remain on. This is done in a unique manner in the invention with a saturable-reactor system, which is initially described with the aid of Figure 2 and the following chart:

NORMAL CONDITION: $S_2$, $S_5$ CLOSED. $S_1$, $S_3$, $S_4$ OPEN

| Time (Seconds) | Operation | Relay Operation | Function |
|---|---|---|---|
| 0 | $S_5$, $S_2$ opens | K–116 energized | No voltage applied. |
| 2 | $S_1$ closes | K–114 energized | 115 v.a.c. to $T_1$. |
| 2.050 | $S_3$ closes | K–115 energized | B+ to $T_2$ control winding. |
| 2.230 | $S_5$, $S_2$ closes $S_1$ opens. | K–116 and K–114 de-energized. | A.C. voltage rising to 115 v. to lamp circuit. |
| 2.330 | $S_3$ opens | K–115 de-energized. | Full 115 v. to lamps. |
| If fault is being received. | $S_4$ closes | K–105 energized | 230 v.a.c. to one lamp. |

In the normal condition before operation, switches $S_2$ and $S_5$ are closed and switches $S_1$, $S_3$ and $S_4$ are open. These switches are actually contacts on relays K–114, K–115 and K–116, which are shown in detail with the detailed circuitry of the control panel in Figures 5 and 6. The switches are operated in sequence and at the times shown in the chart.

The circuit of Figure 2 includes an autotransformer $T_1$, and a saturable reactor $T_2$, which has a control winding 41 and variable-inductance windings 42 and 43 connected in series. Between the leads 46 and 47 twelve series circuits are provided, each having a capacitor from the group $C_1$–$C_{12}$, an inductor from the group $L_1$–$L_{12}$, and one of the lamps from the group 11–22. Each inductor of $L_1$–$L_{12}$ exhibits two values of inductance, depending on whether it is magnetically saturated or unsaturated. When unsaturated, coils $L_1$–$L_{12}$ exhibit an inductance of about 500 henries and an inductive reactance of approximately 150,000 ohms. The 0.25 mf. capacitors $C_1$–$C_{12}$ each have about 12,000 ohms reactance. Thus, it is seen that each series circuit is then highly inductive; and in practice, something less than one milliampere flows in each series circuit. This produces less than 0.1 volt across the lamp terminals and is insufficient to light any lamp, which requires approximately ten volts to be lighted.

The saturated condition for any inductor $L_1$–$L_{12}$ is obtained by applying a current pulse to it steep enough to drive it into saturation, which causes its inductance to drop. The saturated inductance drop causes the series circuit to become resonant at 60 cycles-per-second (the power source frequency); and a large A.C. current flows that maintains the inductance in its saturated condition and lights the lamp.

In the basic operation of the lamp circuitry, a steep current pulse must be applied to the respective inductor $L_1$–$L_{12}$ to cause saturation and resultant lamp lighting when a fault or test indication is necessary; but in resetting the lamp circuits for a test cycle, the A.C. voltage must be removed and reapplied slowly to avoid lighting any lamps.

The saturating current pulse is obtained by using autotransformer $T_1$ to obtain sufficient voltage to fire the lamp. However, the second problem of removing the voltage and reapplying it slowly is more complex. If all the lamps are on and the voltage is suddenly removed, transients exist for some time in the low-frequency series-resonant circuits. Consequently, if the voltage is reapplied uniformly immediately after the circuit is open, some of the lamps will light due to these transients. Much experimentation showed that a one-half second waiting period before reapplying the voltage uniformly was not sufficiently long. However, one second appeared long enough; and a period of two seconds was chosen in practice to provide a safety factor.

Next, the voltage has to be applied uniformly after the two second off-period from a very low value to the full 115 v. A.C. This is accomplished with saturable reactor $T_2$. First, the voltage is applied through its A.C. windings 42 and 43 to the lamp circuits with control winding 41 open. In this condition, windings 42 and 43 have a high impedance of about 65,000 ohms. Thus, most of the voltage appears across these A.C. windings; and only a small amount is immediately applied to the lamp circuits, which is too low to light the lamps.

Next, a direct-voltage source (shown as a battery) is applied to the control winding 41 of the saturable reactor through a resistor $R_1$. The resistor keeps the current in the control winding at a safe value and provides a time constant with the inductance of winding 41 to cause a relatively slow build-up of control current to a maximum value that causes the A.C. voltage across the L-C circuits to rise from about 20 to 100 volts with no steep transient in about 0.070 second. The increasing control current magnetically saturates the cores of reactor $T_2$ and drops the A.C. impedance of windings 42 and 43 from about 65,000 ohms to about 2,000 ohms.

Next, switch $S_2$ (K–116) is closed to short out windings 42 and 43. An added 15 volts is applied to the L-C circuits as a step by the closing of $S_2$; however, the step is too small to cause the lamps to light. Shorting the A.C. windings 42 and 43 serves two purposes: First, if the short by switch $S_2$ did not exist, as when the lamps are lit, windings 42 and 43 would have to carry a large alternating current. And after two or three lamps were lit, the voltage drop across the windings 42 and 43 would reduce the voltage across the L-C circuits below the point where the lamps would stay on. Consequently, no more lamps could be lighted. Second, the current in control winding 41 would have to stay on to maintain the impedance of A.C. windings 42 and 43 low.

The current through control winding 41 is removed by opening switch $S_3$ (K–115) after the A.C. winding short by $S_2$ has been applied. Thus, except for the short period required to reset the lamp circuits (about three seconds), no current flows through any winding of saturable reactor $T_2$ allowing it to be small in size with low-power handling capacity. Furthermore, autotransformer $T_1$ supplies no current, except the short pulses required to light the lamps, and may similarly be made small in size.

After the panel has been tested, it is then required to reset them to off condition so that the interrogation of unattended stations can begin. The reset cycle is:

(1) $S_5$ and $S_2$ are opened.
(2) 2 seconds later, $S_1$ is closed.
(3) 0.050 second later $S_3$ is closed.
(4) 0.180 second later $S_2$ and $S_5$ are closed and $S_1$ is opened.
(5) 0.100 second later $S_3$ is opened.

Thus, $S_5$ and $S_2$ are closed, and $S_1$, $S_3$ and $S_4$ are opened. The lamps are now off and reset for the next interrogation cycle.

It is noted here that as deck B of stepping switch K–112 in Figure 2 moves through its sequence of positions by means yet to be described, if a fault is to be recorded by any lamp, $S_4$ closes momentarily and then opens. This supplies the current pulse necessary to saturate the inductor and light the lamp of the proper L-C circuit.

Figure 4:
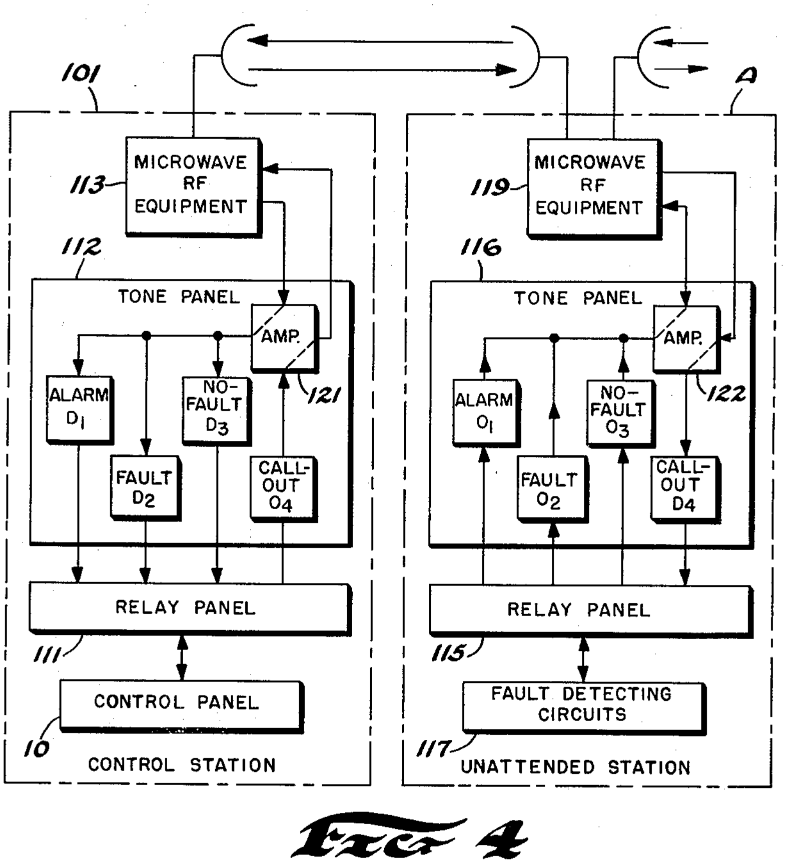
Figure 4 illustrates in block form the fault system at a control terminal station and one of its unattended stations.

The portion of the sensing system at control station 101 consists of three over-all units shown in Figure 4. These are control panel 10, a relay panel 111, and a tone generator-demodulator panel 112. Panel 112 includes a two-way amplifier 121, an oscillator $O_4$ and three detectors $D_1$, $D_2$ and $D_3$.

Similarly, the portion of the fault transmitter system at each unattended station is exemplified by station A in Figure 4 and includes a relay panel 115 which connects a tone generator-demodulator panel 116 to fault detecting circuits 117. Panel 116 includes a two way amplifier 122, with a detector $D_4$ and three oscillators $O_1$, $O_2$, and $O_3$, which are in reverse order from those on the panel 112 at the control station.

The fault detecting circuits are a plurality of circuits coupled to the respective portions of the unattended station which are to be sensed for faults. Such sensing circuits provide an electrical signal when a fault is sensed. They are well-known and are not explained in detail herein. The embodiment herein accommodates eleven fault sensing circuits at each unattended station, which correspond to the eleven lamps 11–22 on control panel 10.

The demodulators $D_1$ through $D_4$ are relays which are energized by respectively different received tones, previously demodulated by the associated microwave equipment. The detectors $D_1$–$D_4$ provide a direct-voltage output when energized. Similarly, oscillators $O_1$ through $O_4$ supply different tones, which are actuated on and off by relays in their respective panels. The tones modulate the microwave transmitter output on any provided band.

The circuitry at any unattended station, such as A, is shown in detail in Figures 7 and 8. Eleven fault-sensing circuits (not shown in detail) have their outputs respectively connected to terminals 1 through 11 in Figure 8. If a fault occurs, a ground connection is provided by the respective fault-sensing circuit to its terminal 1–11.

*General fault cycle*

Assume that fault two occurs at station A, and therefore terminal 2 is grounded. The following events then occur:

(1) and (2) An energized series circuit is supplied through normally-closed contact 2 of K–211, contacts 1 and 2 of K–213, common leads 251 and 252, the winding of relay K–209 to the direct-current voltage source B+.

(3) Therefore, K–209 is energized and closes to actuate the alarm oscillator $O_1$ by completing a circuit as follows: From B+ connected terminal 1 of relay K–207, closed contact 6 of K–205, and the now closed contact 3 of K–209 through leads 253 and 254 to oscillator $O_1$. Thus, $O_1$ receives B+ and provides an output tone which modulates the microwave carrier frequency in transmitter 119, which is relayed to the control station.

This tone is then detected by demodulator $D_1$ at microwave receiver 113 shown in Figure 4 and is provided to tone panel 112. Figures 5 and 6 show in detail relay panel 111 combined with the control panel 110 and relay panel 112.

(4) Upon detection of the oscillator $O_1$ tone, alarm demodulator $D_1$ closes its relay (not shown) and connects lead 150 to ground to energize alarm relay K–101. Thus, relay K–101 is energized to supply itself with a holding ground through contact 1 to supply a ground to the circuit of alarm lamp 26 which then lights, and to supply a ground to the buzzer circuit through the on-off switch and sound the buzzer.

(5) The operator then knows that there is a fault somewhere in the system but does not know where. He proceeds as outlined before to turn buzzer switch 31 off, which turns the buzzer off and turns buzzer-off lamp 28 on. This warns the operator not to leave the buzzer off when he leaves the control panel.

*Lamp test cycle*

(6) Next the operator turns selector switch 32 from the off position to the LT (lamp test) position. The three wafers A, B and C of this switch are shown in the off position in Figure 6. At LT position switch 32 makes contact between wafer B terminals 2 and 3; and this contact is maintained through all remaining switch positions, until the switch is rotated to off again. Wafer A supplies a path through its contacts 2 and 3; and this connection exists only when the selector switch is in the LT position. Wafer C supplies no connection since its wiper is on terminal 1 only.

(7) The operator then pushes the start button 33 which supplies ground to K–116 coil to energize it and it receives holding ground from contact 1 of unenergized K–115 and contact 3 of K–116. Contact $S_5$ of K–116 is now open removing 115 v. A.C. power from terminal 2 of autotransformer $T_1$ (a 115/230 v. A.C. autotransformer). All fault lamps 11–21 and the end lamp 22 then go out if on, since they are supplied through contact $S_5$. The opening of contact $S_2$ of K–116 removes a short existing across windings 42 and 43 of saturable reactor $T_2$. Furthermore, the opening of contact 7 of K–116 removes B+ voltage from all relay coils marked V—A, which are relays K–101, K–102 and K–113. This allows these relays to be reset when K–116 is first closed. Contact 1 of relay K–116 is of the weighted-spring type; and when K–116 closes, contact 1 begins vibrating, supplying a pulsing ground through the coil of relay K–114, which is a slow-close relay and therefore does not have time to close between pulses of ground. The vibration of contact 1 of K–116 must die down to a very low level before K–114 can close. This takes about two seconds.

(8) Thus, two seconds later K–114 closes. Its contact $S_1$ closes to provide 115 v. A.C. to terminal 2 of autotransformer $T_1$. Contact 1 closes to supply ground to K–115 coil.

(9) 0.050 second later relay K–115, a slow-operate relay, closes. Its contact $S_3$ supplies a ground to the control winding 41 of saturable reactor $T_2$ which slowly raises the voltage across the L-C lamp circuits, as explained above. Contact 1 releases the holding ground on K–116.

(10) 0.180 second later K–116 releases. Its holding contact 3 and its weighted-spring contact 1 open, removing the ground connection from relay K–114. Contact $S_5$ of relay K–116 closes paralleling the A.C. connection to terminal 2 of $T_1$, also supplied by contact $S_1$ of K–114. Contact 7 closes to restore B plus voltage to all relay coils marked V—A which include K–101, K–102 and K–113. These relays have been reset during the V—A off period. Contact $S_2$ of relay K–116 now supplies a short across saturable-reactor A.C. windings 42 and 43. Also, contact 5 of K–116 closes, supplying a ground contact from contact 5 of relay K–115 through wafer B of selector switch 32 to the coil of K–111. Contact 5 of relay 116 also supplies ground through contact 7 of K–115 and wafer A of selector switch 32 to the coil of relay K–113.

(11) About .020 second later, K–114 opens, and its contact $S_1$ opens but has no effect since this path has been supplied by contact $S_5$ of K–116. Contact 1 of K–114 opens removing the ground for the circuit of the K–115 coil.

(12) 0.100 second later K–115 opens; and its contact 1 closes to restore the path for relay K–116 holding. Contact $S_3$ of K–115 opens to remove current from saturable-reactor control winding 41. Similarly, contact 5 opens to remove the ground being supplied to the coil of relay K–111. And contact 7 opens to remove the ground supplied to the coil of K–113.

(13) Parallel in time with step 11, K–113 closes supplying its own holding ground through its contact 1. Its contact 7 opens the B-plus path to the call-out tone oscillator, supplied through contact 5 of relay K–109 (these contacts will be pulsed.) (Since this a lamp test cycle, it is not desired to call an unattended station; and, therefore, B plus is removed). Contact 2 of relay K–113 provides a circuit that allows the fault lamps 11–21 to be lit. This circuit is from terminal 1 on $T_1$ to terminal 1 of deck B of a fault-lamp stepping switch K–112. Contact 3 supplies current to operate lamp 29. Contact 5 supplies a ground to relay K–102 which then closes and through its contact 4 lights alarm verify lamp 27. Contact 6 of K–113 supplies a ground to relay K–101, which closes and lights alarm lamp 26 through its contact 3 and sounds the buzzer through its contact 5. (This assumes no actual alarm in the system. If an alarm exists K–101 will already be closed.) Contact 8 of K–113 closes a path from terminal 16 of deck A of selector switch K–112 to terminal 7 of K–111.

(14) This step is also parallel in time to step 11. Relay K–111 closes as a result of a ground supplied to one of its coils. (This is a double coil relay. With ground supplied to either coil, the relay will close. But, if ground is supplied to both coils, the relay will open.) Contact 5 of K–111 supplies one holding ground. Contact 3 of K–111 supplies a ground to relay K–109 to energize it.

(15) The relay K–109 coil receives ground through the normally-closed contact of relay K–110, and its series contact 3 of K–111. Relays K–109 and K–110 are slow operate relays requiring 0.050 second to close and 0.070 second to release.

(16) 0.050 second later relay K–109 closes. Ground is supplied from contact 1 of K–109 to the coil of K–110. Contact 3 of K–109 supplies ground to coil 160 of K–112 (stepping switch). The stepping switch then energizes.

(17) 0.050 second later relay K–110 closes to open its contact and the ground being supplied to K–109 coil.

(18) 0.070 second later relay K–109 opens its contact 1, removing the ground being supplied to the K–110 coil; and contact 3 of K–109 opens removing the ground to the coil of stepping switch K–112 and advancing it to its next position 3 on the wiper decks.

(19) 0.070 second later relay K–110 releases restoring the ground to the coil of K–109, closing it again, and beginning an oscillating cycle between these two relays which advance stepping switch K–112 another position for each oscillation cycle. Hence, each oscillation repeats the cycle described in steps 16 to 19. K–109 and K–110 have thus performed a pulsing operation similar to dialing. The pulse-on time used was 0.120 second. The pulse-off time was also 0.120 second. The rate was thus about 4 pulses-per-second. As K–109 opens allowing stepping-switch K–112 to advance, its contact 1 of deck B remains connected to the high voltage tap of autotransformer $T_1$ through contact 2 of relay K–113. Thus, as the stepping switch deck B moves across its contacts, a transient is created on the closing of each contact which lights the respective lights 11–21. Once lighted, they remain on due to the ferromagnetic resonance of their respective circuit. Thus, when switch K–112 has stepped across all its contacts, all of the panel lamps will be on.

(20) As the grounded wiper of switch K–112 engages its last contact 16 on deck A, it is thus grounded and energizes the remaining unenergized coil of relay K–111 through contact 8 of K–113.

(21) With both coils of relay K–111 energized, they buck magnetically and K–111 opens its contact 3 to remove the ground from the pulsing relay combination K–109 and K–110, thus stopping them. Also the holding ground of contact 5 of K–111 is removed, de-energizing one of the coils of K–11. However, its contact 1 provides a ground through contact 2 of K–103, through contact 1 of the off-normal spring deck C of stepping switch K–112, and through contact 1 of the ratchet mechanism D of switch K–112 to the stepping-switch coil 160. Stepping switch K–112 then motors to home contact 1 on decks A and B at which time contact 1 of deck C opens to shut stop the switch movement.

At this point the lamp test cycle, started with step 6, is complete. All lamps are on.

*Calling cycle*

The fault can now be located by a process of interrogation, as previously outlined. In more detail, this involves the following steps:

(22) The operator turns selector switch 32 from the LT position to position A to check the first unattended station. He then pushes start button 33 which causes the fault sensing system to reset and then call station A. Selector switch wafer B still connects its contacts 2 and 3. Wafer A has now opened the connection between its contacts 2 and 3 preventing the lamp test relay K–113 from being energized. Wafer C is now supplying a connection between its contacts 1 and 2.

(23) The cycle described in steps 7 through 15, omitting step 13 follows, exactly as before, except that relay K–113 cannot be energized, since the contacts on selector switch wafer A are open.

(24) The cycle described by steps 16 through 19 then follows with only one additional operation. Since K–113 is open, B-plus power can be fed from contact 5 of pulsing relay K–109 through contact 7 of K–113 to the call-out tone oscillator $O_4$. Thus, K–109 now causes a tone to be fed out at the same time stepping switch K–112 is energized.

In this way stepping switch K–112 actually counts the call-out pulses. Thus, the cycle described in steps 16 through 19 repeats until deck A of stepping-switch 112 is at a contact predetermined by the setting of the selector switch 32. In this specific case of station A, only one pulse is provided.

(25) At the conclusion of step 18, K–109 is released, turning off oscillator $O_4$ and de-energizing the stepping switch coil 160 of K–112. This causes stepping switch K–112 to advance to its selected contact 3. Ground is then supplied from contact 1 of K–105 through the homing contact 1 of deck A of stepping-switch K–112 to its contact 3, to contacts 2 and 1 of wafer C of selector switch 32, to contact 9 of K–113, to contact 7 of K–111.

Relay K–111 then opens removing the ground to pulsing relays K–110 and K–109. All this happens before step 19 has completed. That is, K–111 has removed the ground to the contact of K–110 before K–110 has released.

(26) When K–111 opens, ground is supplied from its contact 1 through contact 2 of K–103, to contact 1 of normal-off deck C of K–112. This causes the stepping switch to motor to home position as described previously in step 21.

Thus, it is seen that the position of selector switch 32 determines the number of call-out pulses transmitted.

*Interrogation cycle*

After the calling cycle is complete, the interrogation cycle begins. Only the particular station called responds during this portion of the cycle. Reference is now made to Figures 7 and 8:

(27) When the calling cycle is initiated, all unattended stations respond as follows: The call-out tone pulses generated by oscillator $O_4$ are converted into D.C. pulses by the tone demodulator $D_4$ which are transmitted to the coil of relay K–207.

(28) Relay K–207 closes and remains closed as long as the call-out tone is on and opens when the call-out tone is turned off. Thus, K–207 follows exactly the operation of K–109 at the control station.

(29) Contact 4 of K–207 connects ground to the coil of K–203, which closes its contact 3 to energize relay K–202. Thus, K–202 opens its contact 1, removing ground from contact 1 of normally-off deck C of stepping switch K–201. This prevents stepping switch K–201 from motoring to home position after the first pulse is received.

(30) Simultaneously with step 29, contact 6 of K–207 supplies a ground through contact 8 of relay K–205 to the coil 260 of stepping switch K–201 to energize it.

(31) When the received call-out tone ends, relay K–207 opens, and the ground connection is removed from stepping switch K–201 allowing it to advance to contacts 3 on decks A and B. Also, the opening of K–207 de-energizes K–203, which in turn de-energizes K–202. K–203 and K–202 are slow release relays requiring 0.4 second to release. This is much longer than the tone off time between pulses of a calling cycle. Thus, K–203 does not have time to release between pulses. This, of course, concerns stations other than A which have a call signal of two or more tone pulses.

The cycle described in steps 28 to 31 repeats for each call-out pulse received. At the end of the call-out pulse train, all fault transmitters except the one called will reset. This occurs as follows:

(32) 0.400 second after the last call-out pulse has been received, K–203 opens as a result of the ground from contact 4 of K–207 being removed. And, contact 3 of K–203 opens removing the ground to K–202 coil.

(33) 0.400 second later, K–202 opens; and its contact 1 closes supplying a ground through contact 1 of normally off deck C of K–201 and through contact 1 of ratchet deck D of K–201. This causes the stepping switch to motor to home position 1.

In this manner, all unattended stations, except the one called, have their step switches K–201 restored to home position. The called station responds as follows:

(34) After the last pulse has been received, stepping switch deck A rests at stator contact A, since we are referring to station A. At the other unattended stations, lead 261 is connected to a different terminal, it having the letter designation of the respective station. Ground will then be supplied to contact A (at station A) by the wiper of deck A which is grounded through its contact 1. Thus, lead 261 is now at ground potential and connects to one side of contact 1 of relay K–203.

(35) 0.4 second later K–203 opens removing the ground supplied to K–202. Also, contact 1 of K–203 closes to connect a ground through contact 1 of thermal relay K–204, contact 6 of K–210 to the coil of K–205 to energize it.

(36) When K–205 is energized, a holding ground is provided by its contact 4 through contact 1 of thermal relay K–204. This holds K–205 closed even after the ground from the stepping-switch deck A is removed. Contact 2 of K–205 supplies a ground to the heating element of K–204. (In the event of any failure to complete the cycle, K–204 will open its normally closed contact 1 after one minute to reset stepping switch K–201 to home position. The interrogation cycle takes about five seconds in the embodiment of the invention. Thus, K–204 normally has no effect.)

*Verifying answer cycle*

(37) Now it is necessary for the called station to verify that it has been called. A circuit is provided from the B plus source through contact 1 of relay 207, contact 5 of the presently energized K–205 to terminal 4 of relay K–209. If K–209 is open, the circuit is not completed. However, if the alarm relay K–209 is closed by the existence of a fault at this particular unattended station, B plus is fed through contact 1 of K–209 to alarm-verify oscillator $O_2$. At this stage of the cycle, oscillator $O_2$ verifies the original alarm, and the transmission of its tone causes alarm-verify light 27 to light at the control panel and inform the operator that the particular called station is originating the alarm tone. Also, contact 6 of K–205 is now open to interrupt B plus power to the alarm oscillator and shut it off.

(38) 0.4 second after K–203 opens, K–202 opens restoring stepping switch K–201 to home position 1 as described in step 33.

With the stepping switch and its decks at home position and relay K–205 energized, the following results: Ground is supplied by deck A through its contact 2, through contact 1 of K–205 to energize coil 267 of K–206. (K–206 is the usual double coil relay connected to allow either coil 267 or 268 to close the relay. But, if both coils are energized the relay opens.)

(39) Relay K–206 thus is closed supplying itself with a holding ground through contact 1. Its contact 3 provides a ground through contact 4 of K–210 (Figure 8) to energize relay K–211, which opens all its contacts, 1 through 11. This removes the common connection of all fault detection circuits into alarm relay K–209, de-energizing it and thus allowing each individual fault detection circuit to be sensed. Therefore, when K–211 closes, relay K–209 opens its contact 1, if closed; and the B-plus power is interrupted to alarm-verify oscillator $O_2$.

Next, a tone is transmitted by oscillator $O_3$ to tell the control station that the unattended station is ready to be interrogated. This is accomplished by a B-plus path from contact 1 of K–207, contact 5 of K–205, contact 2 of K–209, through terminals 2 and 1 of deck B of stepping-switch K–201, through contact 1 of K–208 to oscillator $O_3$. Furthermore, contact 4 of K–206 closes to energize K–203, which then closes and in turn closes relay K–202.

*Interrogation cycle*

Summarizing, the called station has thus supplied an alarm-verify tone, if it has a new fault, has energized its relays K–205 and K–206, and has transmitted an interrogate start tone. At this point the calling cycle is complete and the interrogate cycle begins:

(40) Referring to Figure 5, if the called station is sending an alarm tone, an alarm verify tone is sent at the end of the calling cycle before the interrogate start tone is sent and is received by receiver-transmitter 113. Detector $D_2$ demodulates the received alarm-verify tone at the control station by supplying a ground through contact 5 of K–103 to the coil of K–102, which then energizes and supplies itself a holding ground by contact 2 and through its contact 4 lights alarm-verify lamp 27.

(41) About 0.5 second later the alarm-verify tone stops and the interrogate-start tone is received by detector $D_3$, which supplied a ground contact 3 of K–103 to the coil of K–106.

(42) K–106 then energizes supplying a ground through its contact 1 to the coil of K–104. K–104 energizes feeding a ground from its contact 3 to coil 171 of K–103. K–103 energizes.

(43) K–103 is a double-coil relay connected to allow either coil 171 or 172 to close the relay, but to allow the relay to open when both coils are energized. When K–103 closes a holding ground is supplied by its contact 7. Its contact 2 opens a ground circuit supplied by contact 1 of K–111 to contact 1 of normally off deck C of stepping switch K–112. This prevents the stepping switch from motoring to home after the first pulse is received. Contact 5 of K–103 opens to interrupt the output of demodulator $D_2$ to alarm-verify relay K–102. The ground of demodulator $D_2$ then is supplied through contact 6 of K–103 to the coil of K–105, the fault relay, which energizes. Also contact 1 of energized relay K–103 completes a circuit to the coil of keying relay, K–108, through contact 3 of K–107 and contact 2 of K–106. Furthermore, contact 3 of K–103 opens, removing the output of demodulator $D_3$ from the coil of K–106 to de-energize it. And contact 4 of K–103 closes supplying this demodulator ground output through contact 1 of K–104 to the coil of K–104, which is thus energized as long as the interrogate start tone is on.

(44) K–106 is a slow-release relay. Thus, 0.4 second after K–103 closes, K–106 de-energizes to open its contact 1 and remove the ground fed by it to the coil of K–104, which is held energized by the circuit described in (43). Contact 2 of K–106 closes allowing the ground from contact 3 of K–107 to be supplied through contact 1 of K–103 to the coil of K–108, energizing it.

When K–108 energizes, it energizes oscillator $O_4$ to transmit the first interrogate tone. The 0.4 second delay between the reception of the $O_3$ tone and the transmission of call-out tone $O_4$ is employed to insure that the stepping switches at all the unattended stations have reset to their home position after the calling cycle.

(45) When K–108 energizes, B plus is supplied to oscillator $O_4$ through contact 1 of K–108. Ground is supplied from contact 2 of K–108 through the stepping switch deck C contact 3, through the stepping switch ratchet deck D contact 1 to coil 160. This causes stepping switch K–112 to energize, which then breaks the ground provided through deck D contact 1. Thus, the switch de-energizes at which time the K–112 wipers advance to their next position 3 on the decks; also the normally-off deck C contact 3 opens and its contact 4 closes to supply a ground directly to coil 160, which again energizes.

At this point the interrogate-start tone $O_3$ is still being received, the call-out tone $O_4$ is being transmitted and the stepping switch wipers are at position A with the stepping-switch coil 260 energized. Now refer to the schematic of Figures 7 and 8.

(46) The call-out tone of oscillator $O_4$ is transmitted on the microwave carrier by the control station and is received by each station, where it is converted to D.C. by the call-out demodulator $D_4$ and energizes relay K–207. Only station A is in a condition to utilize the received tone, because the other stations reset their stepping switches K–201 to home during the calling cycle. Thus, contact 3 of energized K–207 provides B plus through contact 5 of energized K–206, through contact 1 of K–208, to oscillator $O_3$. Contact 4 of K–207 serves no purpose during the interrogation cycle since ground is already being supplied to delay relay K–203 by contact 4 of K–206. Hence, K–203 and K–202 are energized. Contact 6 of K–207 feeds ground through contact 7 of energized K–205 to contact 2 of stepping-switch off-deck C. Stepping switch coil 260 is energized through contact 1 of ratchet deck D of switch K–201. Thus, K–201 is energized with its wipers at position A.

(47) At this point, deck C of K–201 (in Figure 8) supplies a ground from its contacts 3 and 1 to the coil of K–208 which is thus energized to open its contact 1 which interrupts B plus to oscillator $O_3$ to stop it, and to close its contact 3 to apply B plus to oscillator $O_2$ to start it.

Thus, the receipt of the call-out tone of oscillator $O_4$ has caused the unattended station to stop sending the interrogate-start tone of oscillator $O_3$ and start sending the fault tone of oscillator $O_2$. Refer back to the block diagram of Figure 5.

(48) When interrogate-start demodulator relay $D_3$ opens, the ground is removed that it had provided through contact 4 of K–103 and contact 1 of K–104 to its coil. Hence, K–104 de-energizes, completing a path through its contact 2 to the coil of lamp-lock-out relay K–107 to energize it.

Simultaneously, a fault tone is received by demodulator $D_2$ at the control station, which supplies a ground through contact 6 of K–103 to energize fault relay K–105.

(49) Accordingly, contact $S_4$ of K–105 connects the high voltage terminal of autotransformer $T_1$ by the circuit from terminal 1 of $T_1$, contact $S_4$, through contact 2 of K–107 to terminals 1 and 3 of deck B of stepping switch K–112. However, no lamp is lighted since there is no connection to contact 3 of deck B.

The purpose of this operation is to remove the interrogate-start tone from $O_2$ and allow K–104 to open and switch to reception of the $O_3$ tone.

(50) Contact 1 of K–105 supplies ground to the K–107 coil. Previously, operate lamp 29 was lighted by a ground received through contact 1 of K–105, contact 1 of K–107, and contact 4 of K–113 to lamp 29.

(51) About 25 milliseconds later K–107 energizes and turns off operate lamp 29 by opening its contact 1. Also contact 3 of K–107 opens removing the ground to the K–108 coil.

(52) When K–108 de-energizes, B plus to call-out oscillator 04 is removed to stop its output, and ground is disconnected from stepping switch coil 160, allowing the wipers of stepping switch K–112 to advance to next position 4.

Now, remembering that the call-out tone of $O_4$ has ceased and that the stepping switch is de-energized with its wipers at position 4, refer to Figures 7 and 8, representing the called unattended station.

(53) When the call-out tone of oscillator $O_4$ ceases, the ground provided by demodulator $D_4$ opens to de-energize K–207, whereby its contact 3 opens to remove B plus that had been supplied to oscillator $O_2$ through contact 3 of K–207, contact 5 of K–206, and contact 3 of K–208. Contact 6 of K–207 also opens, removing the ground fed through contact 7 of K–205 and contact 3 of deck C and 1 of deck D of switch K–201. Stepping switch K–201 then advances to next position 4.

(54) This causes the answer relay K–208, to be either closed or open, depending on whether the No. 1 fault sensing terminal 1 (in Figure 8) is receiving fault information (ground) or no-fault information (open). An example is assumed that only one fault exists which causes its sensing circuit to provide a ground at sensing terminal 5. Thus, at position 4 of deck C of switch K–201, an open circuit is observed and relay K–208 is de-energized and oscillator $O_3$ provides a no-fault tone.

With the fault tone of oscillator $O_2$ removed, the stepping switch de-energized with its wipers on contact 4, and the answer relay, K–208, de-energized, the following occurs at the control station. See Figures 5 and 6.

(55) The output of demodulator $D_2$ opens (ungrounded), which de-energizes fault relay, K–105, which in turn de-energizes relay K–107.

(56) When K–107 opens, ground is again supplied by contact 3 to the coil of K–108.

(57) K–108 closes energizing stepping-switch coil 160 as follows: Ground is supplied from contact 2 of K–108 through contact 4 of deck C to coil 160. Contact 1 of K–108 again supplies B plus to the call-out oscillator $O_4$ to transmit another call-out tone to the called unattended station.

Thus, the stepping switch is energized with its wipers at position 4, and the call-out tone is being transmitted. Refer again to Figures 7 and 8.

(58) Call-out demodulator $D_4$ is again actuated to provide a ground to K–207 which energizes. Contact 6 of K–207 supplies a ground through contact 7 of K–205 and contact 2 of deck C to coil 260 of stepping switch K–201. Contact 3 of K–207 feeds B plus through contact 5 of K–206 and contact 1 of K–208 to oscillator $O_3$ which provides a no-fault tone to the microwave carrier. (K–208 is de-energized since there is a no-fault indication (no ground) at position 4 of answer deck C.)

Stepping switch K–201 is therefore energized and the no-fault from $O_3$ is being supplied to the microwave carrier. Refer to Figures 5 and 6:

(59) Consequently, ground is supplied by no-fault tone demodulator $D_3$ through contact 4 of K–103, contact 2 of K–104 to the coil of K–107. Also, the same ground is supplied through contact 1 of K–107 and contact 4 of K–113 to operate lamp 29 which lights momentarily before K–107 opens its contact 1.

The flashing of operate lamp 29 during the interrogation cycle merely indicates to the operator that the unit is working properly.

(60) Therefore, when K–107 energizes, operate lamp 29 is turned off, and the ground supplied by contact 3 of K–107 to the keying relay, K–108, coil is removed.

(61) When K–108 de-energizes, B plus is removed from call-out oscillator $O_4$, and ground is removed from stepping switch coil 160, it advances to next position 5 to receive the information of the fault-detection-circuit terminal 2 in Figure 8.

(62) Termination of the call-out tone causes the output ground of demodulator $D_4$ to be removed, which de-energizes the K–207 coil. When contact 3 of K–207 opens, B plus is removed from no-fault oscillator $O_3$. (The B plus path had been through contact 3 of K–207, contact 5 of K–206, contact 1 of K–208 to oscillator $O_3$.) Also contact 6 of K–207 is open, removing the ground supplied to the stepping-switch coil 260. Hence, the wipers of stepping switch K–201 advance to position 5.

(63) The deck C wiper (Figure 8) is now connected to terminal 2 to receive information from fault-detecting circuit No. 2 (not shown). In our example, it is assumed that a fault exists at position No. 2, thus there is a ground provided to stator contact 5 of deck C of switch K–201. This ground is fed through deck C to the coil of K–208, which energizes, and its contacts interrupt B plus to no-fault oscillator $O_3$ and provide it to fault oscillator $O_2$ which then transmits a fault tone.

Now, remembering that stepping switch K–201 is de-energized, that the selector deck wipers are on contact 5, that K–208 is closed, and that the no-fault tone of $O_3$ has been stopped, refer to Figures 5 and 6.

(64) The loss of the no-fault tone by oscillator $O_3$ at the unattended station opens the ground supplied by control-station demodulator $D_2$ through contact 6 of K–103, and contact 2 of K–104 to the coil of K–107.

(65) Hence, K–107 opens, again supplying a ground from its contact 3 through the path previously described to the coil of K–108.

(66) K–108 closes, again energizing stepping-switch coil 160 and supplying B plus to the call-out oscillator $O_4$.

With stepping switch K–201 energized, its wipers at position 5, and the call-out tone being received, the unattended station responds as follows in Figure 7:

(67) The output circuit of the call-out demodulator $D_4$ again closes K–207 and its contact supplies B plus by the path already described, through contact 3 of K–208 to fault oscillator $O_2$, to start it. Also, stepping-switch coil 260 is energized by contact 6 of K–207.

Thus, the fault tone of oscillator $O_2$ is being transmitted, and the stepping-switch coil is energized. Refer to Figures 5 and 6.

(68) Receipt of the fault tone causes a ground to be supplied by demodulator $D_2$ through contact 6 of K–103 to the coil of K–105.

(69) K–105 energizes supplying A.C. from high-voltage terminal 1 of autotransformer $T_1$ through contact S4 of K–105, through contact 2 of K–107 through the wiper of deck B of switch K–112 (Figure 6) to lamp 12. Contact 1 of K–105 supplies a ground to the coil of K–107, which lights operate lamp 29 through its contact 1 and contact 4 of K–113.

(70) About 25 milliseconds later, K–107 closes, and opens contact 1 to turn off operate lamp 29. Also, K–107 contact 2 opens to break the A.C. circuit to lamp 12 which causes a transient light that lights lamp 12 to indicate fault No. 2 at unattended station A. Contact 3 of K–107 opens removing the ground to K–108.

(71) When K–108 opens, B plus to the call-out oscillator $O_4$ is removed, and the ground to the stepping-switch coil 160 is removed, causing stepping switch K–112 to advance to the next lamp 13. However, lamp 12 remains lighted as explained previously.

Thus, lamp 12 is lighted, the call-out oscillator $O_4$ is off, and the stepping switch is de-energized with its wiper connected to lamp 13.

The cycle described continues until all 11 fault positions have been interrogated. After step 71, the cycle would repeat as described in steps 53 to 61 for the no-fault case or as described in steps 62 to 71 for the fault case. This process of one pulse answering another is sometimes called revertive pulsing.

Following the interrogation of the eleventh fault detecting circuit at the unattended station, control-station stepping switch K–112 moves to lamp 22. Also, unattended-station stepping switch K–201 moves to position 15, wherein its deck C (Figure 8) provides a ground. Thus, the fault tone of oscillator $O_2$ is transmitted and the lamp 22 is lit at the control panel. This tells the operator that the interrogation cycle is at an end.

At the same time the lamp information is being transmitted, alarm oscillator $O_1$ is turned on by supplying it with B plus through contact 3 of K–207, contact 5 of K–206, and contacts 1 and 15 of deck B of K–201. This lights alarm lamp 26 at the control panel unless it is already on, in order to check alarm tone oscillator $O_1$ and demodulator $D_1$.

(72) After end lamp 22 has been lit, K–107 energizes and its contact 3 opens to remove ground from the coil of K–108.

(73) When K–108 opens, call-out oscillator $O_4$ is turned off and the stepping switch K–112 advances to last contact 16.

The loss of the call-out tone $O_4$ at the unattended station causes its fault-tone oscillator $O_2$ to be turned off.

(74) Thus, the ground from $D_2$ through contact 6 of K–103 to the coil of K–105 is removed.

(75) When K–105 opens, ground is connected through its contact 1, through contacts 1 and 16 of deck A of stepping-switch K–112, through contacts 8 of K–103 to its coil 172. K–103 opens because both of its coils are energized. Simultaneously, the loss of ground previously supplied by contact 1 of K–105 to the coil of K–107 causes the latter to open.

(76) When K–103 opens, its contact 1 opens preventing K–108 from closing again. Thus, no more call-out tones are transmitted. Contact 2 of K–103 closes allowing the ground from contact 1 of K–111 to be supplied to closed contact 1 of the stepping-switch normally off deck C and contact 1 of ratchet deck D to stepping switch coil 160. This causes stepping switch K–112 to motor to home at which time normally off deck C contact 1 opens. The control panel relays and switches are thus automatically reset to their original position. All lamps that were turned on during the cycle remain on.

(77) Loss of the last call-out tone causes K–207 to open, preventing B plus from reaching the alarm or fault tone oscillators $O_1$ or $O_2$, and opening contact 6 to disengage the ground from coil 260 of stepping-switch K–201 to advance it to its last position 16.

(78) Deck B of switch K–201 therefore supplies a ground through its contact 16, and contact 6 of K–206 to the coil of relay K–210.

(79) When K–210 energizes, all lockout relays K–212 through K–222 are energized by grounds supplied from K–210. Contact 4 of K-210 opens, removing the ground to the coil of disconnect relay K–211, which then de-energizes. When K–211 de-energizes, all terminals 1 through 11 to the fault-detector circuits (not shown) are reconnected to terminal 2 of their respective lockout relays, K–212 through K–222. A fault-caused ground supplied to any of fault-detection circuit terminals 1–11 is hence provided through contact 3 of its respective relay K–212–K–222 to maintain its coil energized after K–210 is opened. This occurs only for faults found by the interrogation process. Thereafter, the indicated faults are locked-out and can no longer supply a signal to lead 252 and alarm relay K–209. Although in this way the located faults are locked-out from giving an alarm indication, any new fault that occurs immediately closes the alarm relay and supplies an alarm tone. K–210 is then held closed by a ground from contact 3 of K–202 and contact 2 of K–210. Contact 6 of K–210 opens the circuit to relay K–205 to de-energize it.

(80) When K–205 de-energizes, its contact 2 opens removing ground to the heater of the thermal relay K–204. Contact 4 of K–205 opens to remove the holding ground to K–205. Contact 3 of K–205 supplies ground through contact 2 of K–206 to the coil of K–206. K–206 de-energizes.

(81) Contact 4 of K–206 opens to remove ground from delay relay K–203.

(82) 0.4 second later K–203 de-energizes; and its contact 1 opens to remove the ground from the coil of delay relay, K–202.

(83) 0.4 second later K–202 opens. Its contact 3 removes the groun supplied through contact 2 of K–210 to the coil of K–210. Contact 1 of K–202 supplies ground through contact 1 of deck C and contact 1 of deck D of stepping switch K–201, to coil 260. This causes stepping switch K–201 to motor to home position 1.

(84) When K–210 opens, the grounds to all lockout relay K–212–K–222 coils are removed; thus all lockout relays, except those held closed by a fault ground, are open and ready to complete an alarm circuit back to alarm relay K–209 upon the occurrence of another fault at the same unattended station.

The fault-location system at the unattended station is now reset and ready for the next calling cycle. The operator may now turn selector switch 32 (see Figure 1) to the next position B to interrogate that station, and so on, in the same manner until all stations are interrogated, if he wishes to do so.

However, in most cases, there will only be a single station at fault, and it is not necessary to interrogate the remaining stations. Hence, the operator can turn selector switch 32 to its off position and push the start button 37. This merely resets the lamps as described in connection with the calling cycle. In the off position, all three decks on the selector switch are open, thus no calling or lamp testing is performed. If alarm lamp 26 lights again after the operator has pushed start button 32, there is still at least one more fault in the system, and he must interrogate the other fault transmitters to find it. However, if alarm lamp 26 stays out, only the previously found fault exists. Restoring buzzer switch 31 to on-position leaves all lamps off and restores the control panel to the normal position.

While all unattended stations operate during the interrogation cycle, as they do during the calling cycle, since they operate on the call-out pulses, no effect is produced. However, at the end of the interrogation cycle, K–203 opens and no ground is supplied to relay K–205, and the uncalled stations reset exactly as they did at the end of the calling cycle.

Although this invention has been described with respect to a particular embodiment thereof, it is not to be so limited as changes and modifications may be made therein which are within the full intended scope of the invention as defined by the appended claims.

What is claimed is:

1. A system for locating specific types of faults sensed by plural fault-sensing means at a particular communicated relay station in a two-way relay network, said relay station comprising a plurality of bistable devices at said relay station connected respectively to and actuated by said fault-sensing means, each bistable device capable of providing first and second output states indicating the existence or non-existence respectively of said specific types of faults, an interrogation sequence assigned to said bistable devices, with their fault status recognized from their position in said sequence, a stepping switch having plural stator contacts connected respectively to said bistable devices in the order of said interrogation sequence, a fault-tone oscillator, and a no-fault-tone oscillator, double-throw switching means having an input and two alternate outputs, with its input connected to the output of said stepping switch, and the outputs of said switching means connected respectively to said fault-tone oscillator tuating said fault-tone oscillator when receiving the first and said no-fault-tone oscillator, said switching means actuating output state from any connected one of said bistable devices and actuating said no-fault-tone oscillator when receiving the second output state from any connected one of said bistable devices.

2. Means for locating specific types of faults at a relay station in a two-way plural station relay network, said station including a plurality of bistable devices respectively remembering the fault status of particular portions of said station, a first state for each bistable device indicating one of said specific types of faults, and its second state indicating no-fault, an alarm-tone oscillator, means serially connecting said alarm-tone oscillator to all of said bistable devices, said oscillator providing an alarm tone whenever any of said bistable devices is actuated into its first state, sequential switching means respectively connectable to said bistable devices, a fault-tone oscillator, and a no-fault-tone oscillator, double-throw switching means capable of alternately actuating either said fault-tone oscillator or said no-fault-tone oscillator, means connecting said double-throw switching means to said sequential switching means, wherein said fault and no-fault-tone oscillators are actuated respectively by the first and second states of any of said bistable devices connected by said sequential switching means to said double-throw switching means, with the respective bistable devices being recognized by their order of connection by said sequential switching means.

3. Fault locating means as defined in claim 2, in which a control station for said network comprises a callout-tone oscillator, an alarm lamp, and a plurality of fault lamps, means establishing communication between said control station and said relay station, means for lighting said alarm lamp by reception of said tone from said alarm-tone oscillator, means at said control station for pulsing said callout-tone oscillator, the oscillator pulses being received by said relay station and actuating said sequential switching means, the sequence of said pulses being respectively related to the sequence of said fault lamps at said control station and the sequence of bistable devices at said relay station, and means for lighting the respective fault lamps when its corresponding pulses is responded to by the respective bistable device with a fault-tone oscillator actuation.

References Cited in the file of this patent

UNITED STATES PATENTS

| | | |
|---|---|---|
| 2,514,367 | Bond et al. | July 11, 1950 |
| 2,547,011 | Jacobsen | Apr. 3, 1951 |
| 2,564,010 | Jacobs | Aug. 14, 1951 |
| 2,576,892 | Stanton | Nov. 27, 1951 |
| 2,651,021 | Hays | Sept. 1, 1953 |
| 2,696,604 | Markow et al. | Dec. 7, 1954 |
| 2,740,106 | Phelps | Mar. 27, 1956 |
| 2,756,409 | Lubkin | July 24, 1956 |
| 2,762,014 | Anderson | Sept. 4, 1956 |
| 2,800,644 | Hines et al. | July 23, 1957 |
| 2,800,645 | Koch | July 23, 1957 |
| 2,842,753 | Ewen | July 8, 1958 |

UNITED STATES PATENT OFFICE
CERTIFICATE OF CORRECTION

Patent No. 2,980,898 April 18, 1961

Roger H. Mason et al.

It is hereby certified that error appears in the above numbered patent requiring correction and that the said Letters Patent should read as corrected below.

Column 16, line 38, strike out "tuating said fault-tone oscillator when receiving the first" and insert the same after "means ac-" in line 39, same column 16.

Signed and sealed this 19th day of September 1961.

(SEAL)
Attest:

ERNEST W. SWIDER
Attesting Officer

DAVID L. LADD
Commissioner of Patents

USCOMM-DC